United States Patent
Iwanami et al.

(10) Patent No.: US 11,004,629 B2
(45) Date of Patent: May 11, 2021

(54) LEVER SWITCH MOUNTED ON A VEHICLE

(71) Applicant: TOYO DENSO KABUSHIKI KAISHA, Minato-ku (JP)

(72) Inventors: Masayuki Iwanami, Hidaka (JP); Takatoshi Komatsu, Hikone (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/725,741

(22) Filed: Dec. 23, 2019

(65) Prior Publication Data
US 2020/0286701 A1    Sep. 10, 2020

(30) Foreign Application Priority Data

Mar. 7, 2019 (JP) .............................. JP2019-041777

(51) Int. Cl.
*H01H 21/22*     (2006.01)
*H01H 21/04*     (2006.01)

(52) U.S. Cl.
CPC ............ *H01H 21/22* (2013.01); *H01H 21/04* (2013.01); *H01H 2215/00* (2013.01)

(58) Field of Classification Search
CPC .... H01H 21/22; H01H 21/04; H01H 2215/00; H01H 3/04; H01H 9/02; H01H 2009/0278; H01H 2231/026; B60Q 1/343
USPC ....................................................... 200/335
See application file for complete search history.

(56) References Cited

U.S. PATENT DOCUMENTS

| 5,739,751 | A  | * | 4/1998 | Ishihara | B60Q 1/1469 340/475 |
| 6,268,575 | B1 | * | 7/2001 | Hayase | B60Q 1/1469 200/561 |
| 6,534,733 | B2 | * | 3/2003 | Schwartz | B60Q 1/1461 200/4 |
| 7,663,477 | B2 | * | 2/2010 | Shimizu | B60Q 1/40 340/476 |
| 10,293,744 | B1 | * | 5/2019 | Lovlie | B60Q 1/40 |

FOREIGN PATENT DOCUMENTS

JP    2012-190796    10/2012

* cited by examiner

*Primary Examiner* — Edwin A. Leon
(74) *Attorney, Agent, or Firm* — Cozen O'Connor

(57) ABSTRACT

A lever switch which is capable of preventing loud operating noise from being generated during stepwise operation of an operating lever. The lever switch has a case, a click feeling generator placed inside the case, and a switch moving body placed inside the case and rotated with respect to the case by operating the operating lever. The click feeling generator has trough portions that abut against a convex portion of the switch moving body. Click feelings are given by the convex portion of the switch moving body sequentially abutting against the trough portions in response to stepwise operations of the operating lever. The convex portion of the switch moving body is urged toward the click feeling generator. The click feeling generator and the case are placed away from each other with a space left between them in a direction in which the first case is urged.

8 Claims, 4 Drawing Sheets

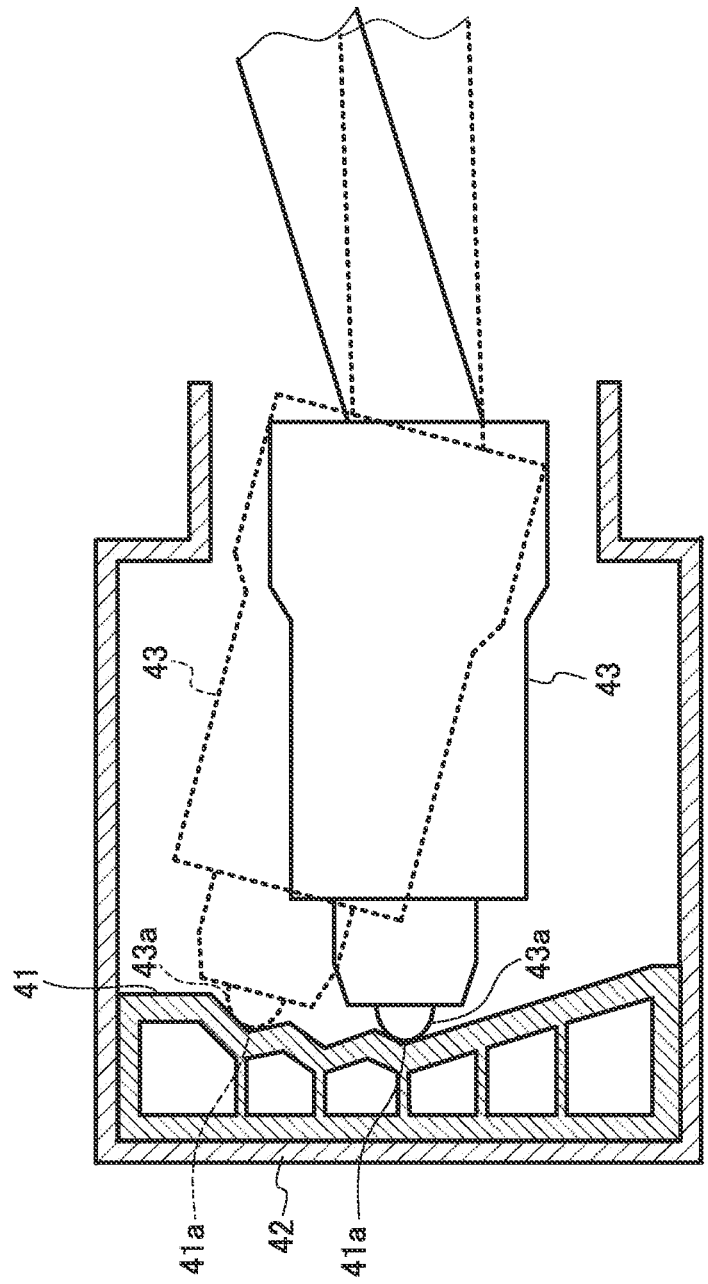

LEVER SWITCH MOUNTED ON A VEHICLE

BACKGROUND OF THE INVENTION

Field of the Invention

The present invention relates to a lever switch that is mounted on a vehicle, and in particular to a lever switch that is used as a wiper switch.

Description of the Related Art

A lever switch is known which is mounted on a vehicle and gives click feelings by causing a switch moving body, which rotates in response to operation of an operating lever, abutting against a click feel generating surface of a click feeling generator. When, for example, this type of lever switch is applied to a turn signal switch, a first driving body which is the switch moving body projecting from a base portion of the rotary operating lever is pressed against a cam member which is the click feeling generator disposed in opposed relation to the base portion, and when the first driving body abuts against a trough portion of the cam member, a click feeling is given (see, for example, Japanese Laid-open Patent Publication (Kokai) No. 2012-190796).

Also, when, for example, this type of lever switch is applied to a wiper switch which is operated in a stepwise manner, a plurality of trough portions is provided on the click feel generating surface of a click feeling generator, and click feelings are given by the switch moving body abutting against these trough portions in response to the stepwise operation of the wiper switch.

The switch moving body is usually urged toward the click feeling generator by an urging member such as a spring so as to reliably come into contact with the click feel generating surface of the click feeling generator, and therefore, when abutting against the trough portions in response to stepwise operation of the wiper switch, an end of the switch moving body is caused to collide with the bottoms of the respective trough portions by urging force, and hence a big operating noise may be generated upon each operation of the operating lever.

SUMMARY OF THE INVENTION

The present invention provides a lever switch which is capable of preventing a big operating noise from being generated when an operating lever is operated in a stepwise manner.

Accordingly, the present invention provides a lever switch comprising a case, a click feeling generator configured to be placed inside the case, and a switch moving body configured to be placed inside the case and rotated with respect to the case by operating an operating lever. The click feeling generator has a plurality of trough portions that abut against an end of the switch moving body, click feelings are given by the end of the switch moving body sequentially abutting against the trough portions in response to stepwise operations of the operating lever, the end of the switch moving body is urged toward the click feeling generator, and the click feeling generator and the case are placed away from each other with a space left therebetween at least in a direction in which the end is urged.

According to the present invention, a big operating noise is prevented from being generated when the operating lever is operated in a stepwise manner.

Further features of the present invention will become apparent from the following description of exemplary embodiments (with reference to the attached drawings).

BRIEF DESCRIPTION OF THE DRAWINGS

FIG. 4 is a cross-sectional view schematically showing an internal structure of a conventional lever switch.

DESCRIPTION OF THE EMBODIMENTS

An embodiment of the present invention will now be described in detail with reference to the drawings.

Figure 1A:
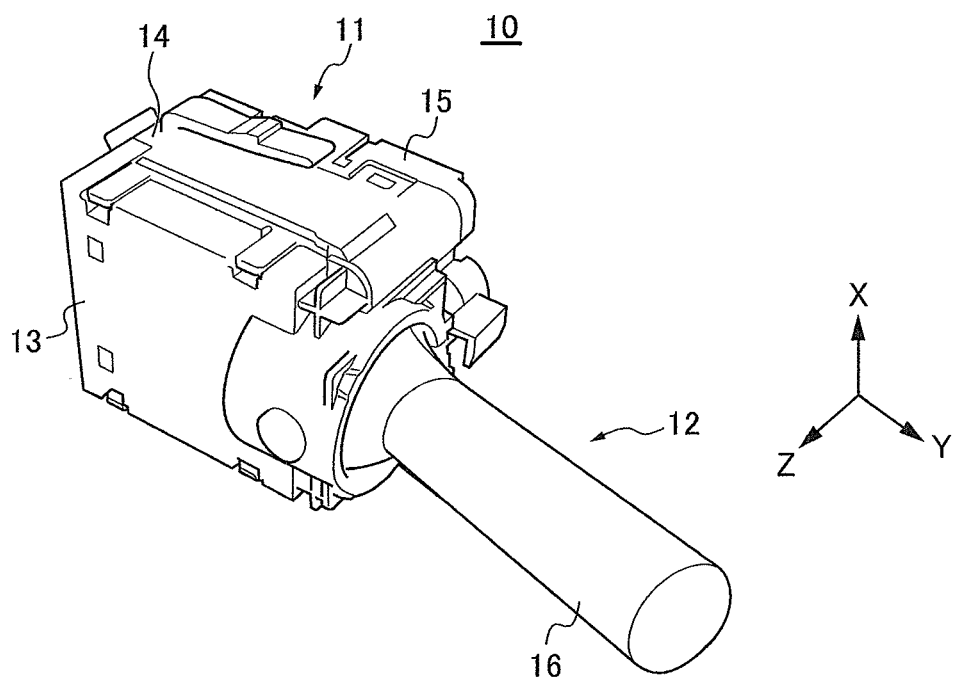
FIGS. 1A and 1B are perspective views schematically showing an appearance of a wiper switch which is a lever switch according to an embodiment of the present invention.
Figure 1B:
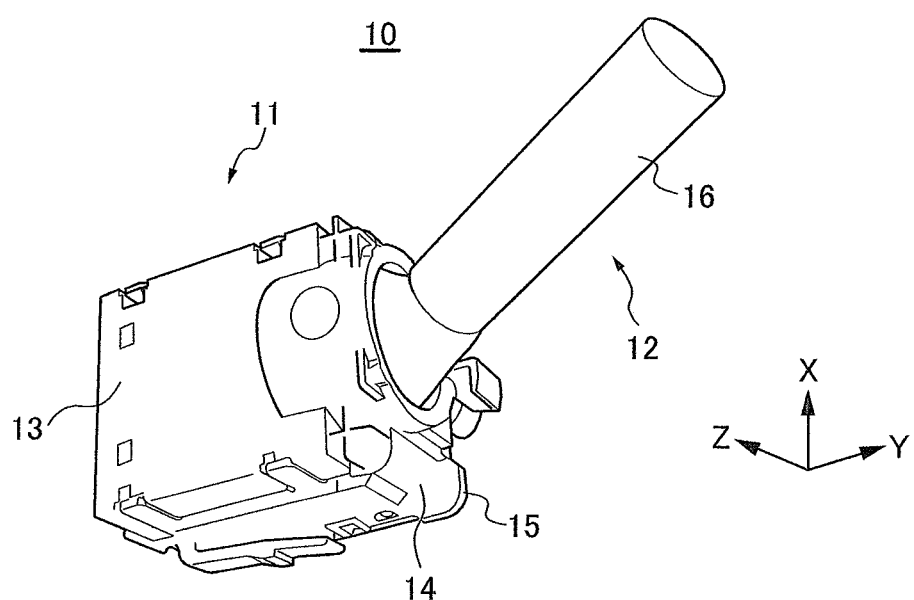

FIGS. 1A and 1B are perspective views schematically showing an appearance of a wiper switch which is a lever switch according to an embodiment of the present invention, in which FIG. 1A is a perspective view taken from the upper right, and FIG. 1B is a perspective view taken from the lower right.

Referring to FIGS. 1A and 1B, the lever switch 10 has a main body 11 which is a housing, and a lever body 12 which is rotatable relatively to the main body 11. The main body 11 is box-shaped and comprised mainly of a first case 13, a second case 14, and a third case 15. The lever body 12 is comprised mainly of an operating lever 16 and a switch moving body 17. The operating lever 16 is rotated by a user. In the following description, directions are defined using an XYZ coordinate system in FIGS. 1A and 1B.

Figure 2:
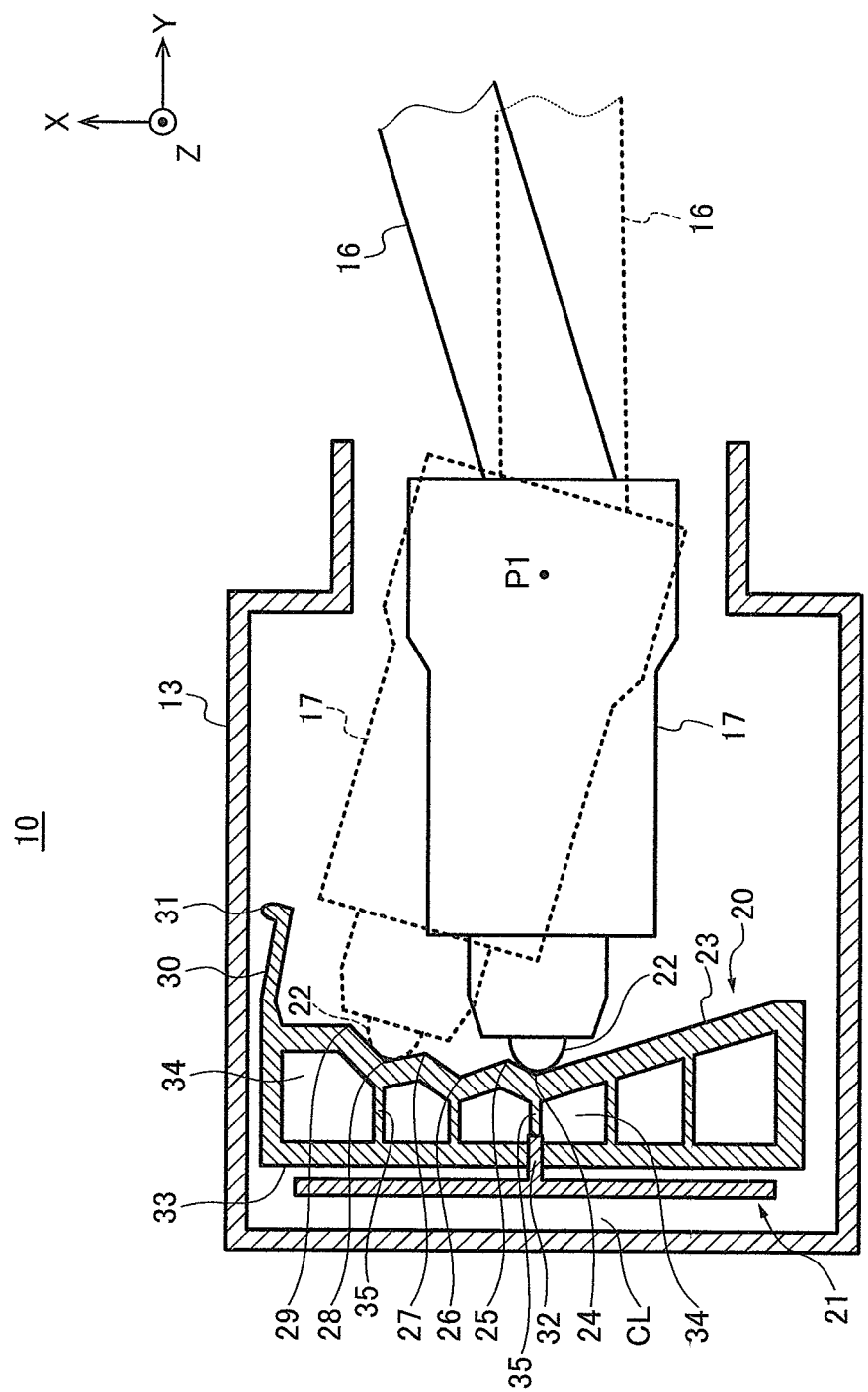
FIG. 2 is a cross-sectional view schematically showing an internal structure of the lever switch according to the present embodiment as viewed in a direction Z.

FIG. 2 is a cross-sectional view schematically showing an internal structure of the lever switch according to the present embodiment as viewed in a direction Z. In FIG. 2, a click feeling generator 20 and a supporting wall 21 are illustrated in addition to the first case 13, the switch moving body 17, and so forth. It should be noted that for ease of understanding, component elements are schematically illustrated in FIG. 2. Thus, FIG. 2 includes component elements differing from those in FIGS. 1A and 1B in their shapes and dimensions.

Referring to FIG. 2, the lever body 12 as a whole rotates about a rotation center axis P1. The rotation center axis P1 is substantially parallel to a Z axis. A shaft provided in either one of the main body 11 and the lever body 12 and a bearing provided in the other one are engaged with each other to implement rotation of the lever body 12.

In the lever body 12, the operating lever 16 and the switch moving body 17 are coupled to each other, and rotation of the operating lever 16 by the user causes the switch moving body 17 to rotate about the rotation center axis P1. The switch moving body 17 has a convex portion 22 (end portion) at an end thereof in a direction opposite to a direction Y (hereafter referred to as "the reverse Y direction"). The convex portion 22 is a substantially rod-shaped member, whose end in the reverse Y direction has a semi-spherical shape, and partially embedded in the switch moving body 17. The convex portion 22 is urged in the reverse Y direction by an urging member incorporated in the switch moving body 17 such as a coil spring.

The click feeling generator 20 is a member that is disposed inside the main body 11 (in particular, the first case 13) so as to face the end (the convex portion 22) of the switch moving body 17. The click feeling generator 20 is made of, for example, elastomer and is of substantially uniform cross section in the direction Z. The click feeling generator 20 also has a click feel generating surface 23 comprised of a plurality of crest portions and trough portions extending in a direction X on a side opposite to the switch moving body 17. In the present embodiment, a trough portion 24, a crest portion 25, a trough portion 26, a crest portion 27, a trough portion 28, and a crest portion 29 are formed in this order in the direction X, and the crest portions adjacent to the respective trough portions are connected together by slopes. In the following descriptions, these slopes will be referred to as the connecting slopes.

The convex portion 22 of the switch moving body 17 is urged in the reverse Y direction and thus elastically abuts against the click feel generating surface 23 of the click feeling generator 20. Therefore, with rotational displacement of the switch moving body 17 in response to rotation of the operating lever 16, the convex portion 22 slides in contact with the connecting slopes. At this time, when the convex portion 22 passes through the trough portions 24, 26, and 28, and when the convex portion 22 climbs over the crest portions 25, 27, and 29, displacement directions of the convex portion 22 change to generate click feelings stepwise. It should be noted that the elastic body constituting the click feeling generator 20 is not limited to elastomer, but for example, any other elastic member may be used as long as it has higher elasticity than that of a material (for example, resin) constituting the first case 13.

A terminal board (not shown) on which a plurality of fixed contacts is laid is disposed inside the main body 11 of the lever switch 10. As the switch moving body 17 is displaced while rotating, a contact piece provided in the switch moving body 17 slides in contact with the terminal board. The fixed contacts are placed such that they can come into contact with the contact piece of the switch moving body 17 when the convex portion 22 abuts against the trough portion 26 or the trough portion 28. A wiper moves in operating modes corresponding to the respective fixed contacts as a result of electrical contact and separation caused by the contact piece coming into and out of contact with the fixed contacts. For example, when the convex portion 22 abuts against the trough portion 26, the wiper moves in an intermittent operating mode, and when the convex portion 22 abuts against the trough portion 28, the wiper moves in a continuous operating mode. It should be noted that when the convex portion 22 abuts against the trough portion 24, the wiper does not move.

In the lever switch 10, the click feeling generator 20 has a cantilever-shaped projecting piece 30 which projects in the direction Y from an end of the click feeling generator 20 in the direction X. The projecting piece 30 has a projection 31 at its end in the direction Y, and the projection 31 projects toward the first case 13. The projection 31 is comprised of a protrusion body elongated in the direction Z. As will be described later, even after the convex portion 22 climbs over the crest portions, when the switch moving body 17 further rotates clockwise, a portion of the switch moving body 17 other than its convex portion 22, and more specifically, a lateral portion of the switch moving body 17 abuts against the projecting piece 30.

In the lever switch 10, the click feeling generator 20 and the first case 13 are located away from each other in the reverse Y direction with a clearance CL (space) left between them. In the clearance CL, the supporting wall 21 (wall portion) is interposed between the click feeling generator 20 and the first case 13. The supporting wall 21 is a wall member that extends in the direction X and has a rib 32 that projects toward the click feeling generator 20 from substantially the middle of the supporting wall 21 in the direction X. The rib 32 projects through a side face 33 of the click feeling generator 20 on the reverse Y direction side of the click feeling generator 20 (hereafter referred to as "the case-side side face 33") and engages with the click feeling generator 20 to support the click feeling generator 20.

In the click feeling generator 20, a plurality of spaces 34 is formed between the click feel generating surface 23 and the case-side side face 33, and when the convex portion 22 slides in contact with the connecting slopes of the click feeling generator 20, the respective spaces 34 absorb deformation of the connecting slopes pressed by the convex portion 22. On the other hand, the click feel generating surface 23 and the case-side side face 33 are connected together by partitions 35 extending in the reverse Y direction from the respective trough portions 24, 26, and 28. This prevents the respective trough portions 24, 26, and 28 from becoming greatly deformed even if the respective trough portions 24, 26, and 28 are pressed by the convex portion 22 when the convex portion 22 abuts against the respective trough portions 24, 26, and 28, and therefore prevents a click feeling from becoming harder to provide.

FIGS. 3A, 3B, 3C, and 3D are process diagrams useful in explaining how the operating lever of the lever switch according to the present embodiment is rotated.

Figure 3A:
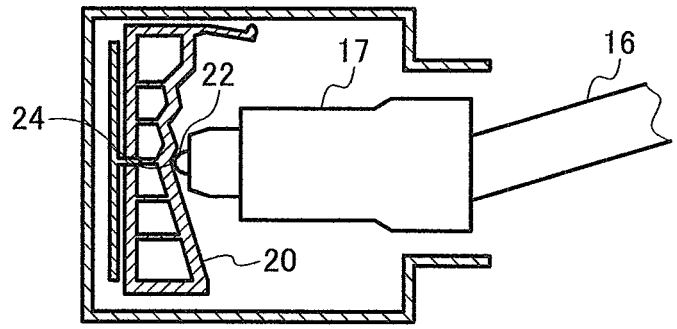
FIGS. 3A, 3B, 3C, and 3D are process diagrams useful in explaining how an operating lever of the lever switch according to the present embodiment is rotated.
Figure 3B:
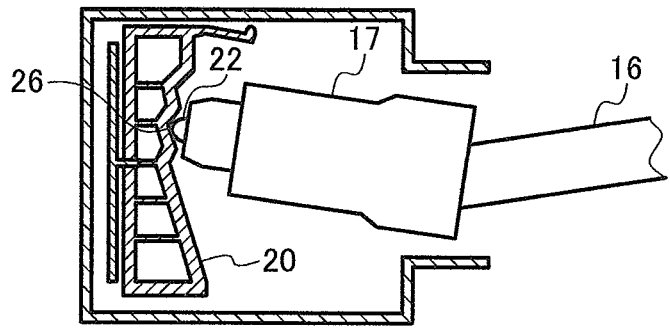
Figure 3C:
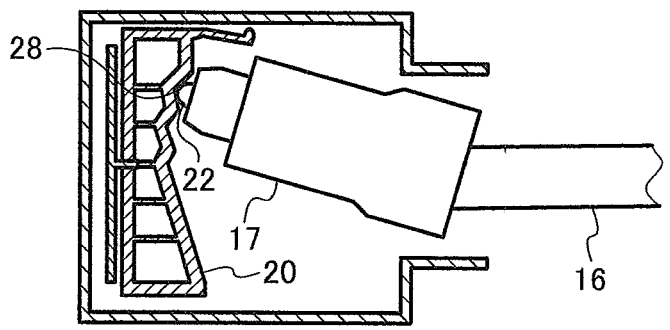
Figure 3D:
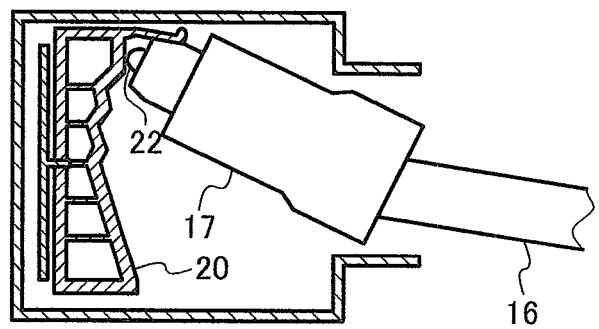

Referring to FIGS. 3A, 3B, 3C, and 3D, when the wiper is not to be moved, the user usually rotates the operating lever 16 to cause the convex portion 22 of the switch moving body 17 to abut against the trough portion 24 (FIG. 3A). Then, to move the wiper in the intermittent operating mode, the user rotates the operating lever 16 clockwise to cause the convex portion 22 of the switch moving body 17 to abut against the trough portion 26 (FIG. 3B). After that, to move the wiper in the continuous operating mode, the user further rotates the operating lever 16 clockwise to cause the convex portion 22 of the switch moving body 17 to abut against the trough portion 28 (FIG. 3C). In these sequential rotational operations of the operating lever 16, when the convex portion 22 abuts against the respective trough portions 24, 26, and 28, the convex portion 22 is caused to collide with the bottoms of the respective trough portions 24, 26, and 28 by urging force. However, since the click feeling generator 20 is formed of the elastic body, impact noise resulting from the collision of the convex portion 22 with the bottoms of the respective trough portions 24, 26, and 28 is attenuated and becomes less likely to be transmitted to the first case 13. This decreases the impact noise emitted externally from the main body 11 and thus prevents loud operating noise from being generated during stepwise operation of the operating lever 16.

Next, when the user continuously rotating the operating lever 16 clockwise, and the convex portion 22 of the switch moving body 17 climbs over the crest portions, the lateral portion of the switch moving body 17 abuts against substantially the middle of the projecting piece 30 in the direction Y. This restricts clockwise rotation of the switch moving body 17. Since the projecting piece 30 is a cantilever-shaped member, it is caused to become warped toward the first case 13 by the abutment of the lateral portion of the switch moving body 17 against the projecting piece 30. The warping of the projecting piece 30 prevents impact noise from being generated by the abutment of the switch moving body 17 against the projecting piece 30 when rotation of the switch moving body 17 is restricted. When the projecting piece 30 becomes warped, the projection 31 projecting toward the first case 13 abuts against the first case 13 first. This causes the projecting piece 30 and the first case 13 to be always contact with each other at the same position (the projection 31), making their contact state stable and making an operating feel stable as well.

In a lever switch 40 with an arrangement shown in FIG. 4, a click feeling generator 41 is placed in contact with a case 42 constituting a main body of the lever switch, and hence impact noise resulting from a collision of an end 43a of a switch moving body 43 with a bottom of a trough portion 41a of the click feeling generator 41 may be directly transmitted to a case 42 and emitted to the outside. As a result, loud operating noise may occur in the lever switch 40, causing deterioration in sound vibration performance of the lever switch 40.

However, in the lever switch 10, since the click feeling generator 20 and the first case 13 are located away from each other in the reverse Y direction with the clearance CL left between them, there is a space in a direction (i.e. the reverse Y direction) in which impact noise resulting from collisions of the convex portion 22 of the switch moving body 17 with the bottoms of the respective trough portions 24, 26, and 28 is transmitted. As a result, the impact noise is never directly transmitted to the first case 13. Moreover, since the supporting wall 21 is interposed between the click feeling generator 20 and the first case 13, the supporting wall 21 blocks the impact noise, making it less likely that the impact noise will be transmitted to the first case 13. This reduces the impact noise emitted from the main body 11 and therefore prevents loud operating noise from being generated during stepwise operation of the operating lever 16.

On the other hand, since the rib 32 of the supporting wall 21 supports the click feeling generator 20, the click feeling generator 20 is prevented from moving and becoming deformed when the convex portion 22 of the switch moving body 17 abuts against the bottoms of the respective trough portions 24, 26, and 28, and as a result, click feelings are given in a reliable manner.

Moreover, since the click feeling generator 20 is formed of elastomer, an appropriate resistive feel is added to the convex portion 22 when the convex portion 22 slides in contact with the connecting slopes of the click feeling generator 20, and this gives a fine operating feel to the user who is rotating the operating lever 16 and also makes it easier for the convex portion 22 to stay in the respective trough portions 24, 26, and 28 when the convex portion 22 abuts against the respective trough portions 24, 26, and 28. This enables the user to reliably select the operating modes of the wiper by means of the operating lever 16.

It should be understood that although the preferred embodiment of the present invention has been described, the present invention is not limited to the embodiment described above, but may be modified and changed without departing from the spirits of the present invention.

For example, although the lever switch according to the present embodiment is applied to the wiper switch, it may also be applied to other switches for use in stepwise rotational operations such as a turn signal switch, a gear shift switch, a cruise control switch, and an exhaust brake switch.

Moreover, although in the embodiment described above, the supporting wall 21 is interposed between the click feeling generator 20 and the first case 13, the supporting wall 21 is not necessarily required so as to prevent loud operating noise from being generated during stepwise operation of the operating lever 16. Merely placing the click feeling generator 20 and the first case 13 away from each other prevents impact noise, which is generated by collisions of the convex portion 22 with the bottoms of the respective trough portions 24, 26, and 28, from being transmitted to the first case 13, and therefore prevents loud operating noise from being generated during stepwise operation of the operating lever 16. For this reason, the click feeling generator 20 should not always be required to be comprised of an elastic body. Namely, the challenges for the present invention can be solved by at least placing the click feeling generator 20 and the first case 13 away from each other.

Furthermore, although in the present embodiment, the projection 31 is provided at the end of the projecting piece 30 in the direction Y, the location at which the projection 31 is provided is not particularly limited as long as the projection 31 abuts against the first case 13 first when the projecting piece 30 becomes warped while rotation of the switch moving body 17 is restricted. For example, the projection 31 may be provided in substantially the middle of the projecting piece 30 in the direction Y.

It should be understood that the lever switch according to the present embodiment may be applied not only to four-wheeled vehicles, but also to motorbikes and other moving bodies in which a driver can ride (the moving bodies are not limited to vehicles but include, for example, small boats and snow mobiles).

This application claims the benefit of Japanese Patent Application No. 2019-041777 filed on Mar. 7, 2019 which is hereby incorporated by reference herein in its entirety.

What is claimed is:

1. A lever switch comprising:
a case;
a click feeling generator configured to be placed inside the case; and
a switch moving body configured to be placed inside the case and rotated with respect to the case by operating an operating lever,
wherein an end of the switch moving body is urqed toward the click feeling generator,
the click feeling generator includes a first face including a plurality of trough portions that abut against the end of the switch moving body and a second face opposite, in a direction in which the end is urged, to the first face,
click feelings are given by the end of the switch moving body sequentially abutting against the trough portions in response to stepwise operations of the operating lever, and
the click feeling generator and the case are separated bodies and are placed away from each other at least in the direction in which the end is urged, with a space left between the case and the second face of the click feeling generator.

2. The lever switch according to claim 1, wherein in the space, a wall portion is interposed between the click feeling generator and the case.

3. The lever switch according to claim 2, wherein at least a part of the wall portion comes into contact with the click feeling generator to support the click feeling generator.

4. The lever switch according to claim 1, wherein the click feeling generator is comprised of an elastic body.

5. The lever switch according to claim 4, wherein the elastic body is formed of elastomer.

6. The lever switch according to claim 1, wherein the click feeling generator comprises a cantilever-shaped projecting piece, and when the operating lever rotates, the projecting piece abuts against a part of the switch moving body other than the end thereof.

7. The lever switch according to claim 6, wherein the projecting piece comprises a projection that projects toward the case, and when the projecting piece is caused to become warped by the part of the switch moving body other than the end thereof abutting against the projecting piece due to the rotation of the operating lever, the projection abuts against the case first.

8. The lever switch according to claim 1, wherein the lever switch is a wiper switch.

* * * * *